(12) United States Patent
Fullerton et al.

(10) Patent No.: US 7,488,545 B2
(45) Date of Patent: Feb. 10, 2009

(54) PERPENDICULAR MAGNETIC RECORDING MEDIUM WITH LAMINATED RECORDING LAYERS FORMED OF EXCHANGE-COUPLED FERROMAGNETIC LAYERS

(75) Inventors: Eric E. Fullerton, Morgan Hill, CA (US); David Margulies, Salinas, CA (US); Hal J. Rosen, Los Gatos, CA (US); Natacha F. Supper, Campbell, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/403,468

(22) Filed: Apr. 12, 2006

(65) Prior Publication Data

US 2007/0243418 A1    Oct. 18, 2007

(51) Int. Cl.
*G11B 5/66* (2006.01)
(52) U.S. Cl. .................................. 428/828.1
(58) Field of Classification Search ................. 428/826, 428/828, 828.1
See application file for complete search history.

(56) References Cited

U.S. PATENT DOCUMENTS

| | | | | |
|---|---|---|---|---|
| 5,051,288 | A * | 9/1991 | Ahlert et al. | 428/828.1 |
| 5,534,355 | A * | 7/1996 | Okuno et al. | 428/811.3 |
| 5,756,202 | A | 5/1998 | Van Kesteren et al. | |
| 6,007,924 | A | 12/1999 | Lal et al. | |
| 6,372,330 | B1 * | 4/2002 | Do et al. | 428/212 |
| 6,391,430 | B1 * | 5/2002 | Fullerton et al. | 428/212 |
| 6,753,072 | B1 | 6/2004 | Chen et al. | |
| 6,759,149 | B1 * | 7/2004 | Chen et al. | 428/828 |
| 6,773,834 | B2 | 8/2004 | Do et al. | |
| 6,821,652 | B1 * | 11/2004 | Okamoto et al. | 428/828.1 |
| 6,942,936 | B2 * | 9/2005 | Oikawa et al. | 428/828.1 |
| 7,008,702 | B2 * | 3/2006 | Fukuzawa et al. | 428/811.2 |
| 7,070,870 | B2 * | 7/2006 | Bertero et al. | 428/828 |
| 7,149,045 | B1 * | 12/2006 | Mallary et al. | 360/55 |

(Continued)

FOREIGN PATENT DOCUMENTS

WO    WO96/25734    8/1996

OTHER PUBLICATIONS

Benakli et al., "Micromagnetic Study of Switching Speed in Perpendicular Recording Media", IEEE Trans. MAG 37, 1564-1566 (2001).

(Continued)

*Primary Examiner*—Holly Rickman
*Assistant Examiner*—Gary D Harris
(74) *Attorney, Agent, or Firm*—Thomas R. Berthold

(57) ABSTRACT

A laminated perpendicular magnetic recording medium has two recording layers (RL1 and RL2) that are separated and magnetically decoupled by a nonmagnetic spacer layer (SL). The SL has a thickness and composition to assure there is no antiferromagnetic or ferromagnetic coupling between RL1 and RL2. Thus in the presence of the write field, RL1 and RL2 respond independently and become oriented with the direction of the write field. Each RL is an "exchange-spring" type magnetic recording layer formed of two ferromagnetic layers (MAG1 and MAG2) that have substantially perpendicular magnetic anisotropy and are ferromagnetically exchange-coupled by a nonmagnetic or weakly ferromagnetic coupling layer (CL). The medium takes advantage of lamination to attain higher signal-to-noise ratio (SNR) yet has improved writability as a result of each RL being an exchange-spring type RL.

11 Claims, 4 Drawing Sheets

U.S. PATENT DOCUMENTS

| | | | |
|---|---|---|---|
| 7,279,240 B2* | 10/2007 | Nolan | 428/828 |
| 2002/0098381 A1* | 7/2002 | Coffey et al. | 428/694 T |
| 2002/0136930 A1 | 9/2002 | Oikawa et al. | |
| 2003/0017364 A1* | 1/2003 | Kikitsu et al. | 428/693 |
| 2003/0096127 A1* | 5/2003 | Hikosaka et al. | 428/480 |
| 2004/0033390 A1* | 2/2004 | Oikawa et al. | 428/694 MM |
| 2004/0219329 A1* | 11/2004 | Oikawa et al. | 428/65.3 |
| 2004/0253485 A1* | 12/2004 | Nolan | 428/694 T |
| 2005/0030676 A1* | 2/2005 | Fukuzawa et al. | 360/325 |
| 2005/0237677 A1* | 10/2005 | Shimazawa et al. | 360/324.12 |
| 2006/0171084 A1* | 8/2006 | Doerner et al. | 360/324.11 |
| 2006/0177703 A1* | 8/2006 | Takenoiri et al. | 428/829 |
| 2006/0177704 A1* | 8/2006 | Berger et al. | 428/829 |
| 2006/0269794 A1* | 11/2006 | Oikawa | 428/831.2 |
| 2006/0286412 A1* | 12/2006 | Jung | 428/826 |
| 2007/0243418 A1* | 10/2007 | Fullerton et al. | 428/828 |

OTHER PUBLICATIONS

Gao et al., "Transition Jitter Estimates in Tilted and Conventional Perpendicular Recording Media at 1 Tb/in2", IEEE Trans. MAG 39, 704-709 (2003).

Victoria et al., "Composite Media for Perpendicular Magnetic Recording", IEEE Trans MAG 41 (2), 537-542, Feb. 2005.

Wang et al., "Composite media (dynamic tilted media) for magnetic recording", Appl. Phys. Lett. 86 (14) Art. No. 142504, Apr. 1, 2005.

Girt et al., "Antiferromagnetically Coupled Perpendicular Recording Media", IEEE Trans. on Magnetics, vol. 39, No. 5, Sep. 2003, pp. 2306-2310.

Supper et al. "Writability Enhancement Using Exchange Spring Media", IEEE Trans MAG, vol. 41, No. 10, Oct. 2005, pp. 3238-3240.

* cited by examiner

PERPENDICULAR MAGNETIC RECORDING MEDIUM WITH LAMINATED RECORDING LAYERS FORMED OF EXCHANGE-COUPLED FERROMAGNETIC LAYERS

BACKGROUND OF THE INVENTION

1. Field of the Invention

This invention relates generally to perpendicular magnetic recording media, and more particularly to a disk with laminated perpendicular magnetic recording layers.

2. Description of the Related Art

Perpendicular magnetic recording, wherein the recorded bits are stored in a perpendicular or out-of-plane orientation in the recording layer, is a promising path toward ultra-high recording densities in magnetic recording hard disk drives. A common type of perpendicular magnetic recording system is one that uses a "dual-layer" medium. This type of system is shown in FIG. 1 with a single write pole type of recording head. The dual-layer medium includes a perpendicular magnetic data recording layer (RL) formed on a "soft" or relatively low-coercivity magnetically permeable underlayer (SUL).

One type of material for the RL is a granular ferromagnetic cobalt alloy, such as a CoPtCr alloy, with a hexagonal-close-packed (hcp) crystalline structure having the c-axis oriented substantially out-of-plane or perpendicular to the RL. The granular cobalt alloy RL should also have a well-isolated fine-grain structure to produce a high-coercivity media and to reduce intergranular exchange coupling, which is responsible for high intrinsic media noise. Enhancement of grain segregation in the cobalt alloy RL can be achieved by the addition of oxides, including oxides of Si, Ta, Ti, Nb and B. These oxides tend to precipitate to the grain boundaries, and together with the elements of the cobalt alloy form nonmagnetic intergranular material.

The SUL serves as a flux return path for the field from the write pole to the return pole of the recording head. In FIG. 1, the RL is illustrated with perpendicularly recorded or magnetized regions, with adjacent regions having opposite magnetization directions, as represented by the arrows. The magnetic transitions between adjacent oppositely-directed magnetized regions are detectable by the read element or head as the recorded bits.

FIG. 2 is a schematic of a cross-section of a prior art perpendicular magnetic recording disk showing the write field H acting on the recording layer RL. The disk also includes the hard disk substrate, a seed or onset layer (OL) for growth of the SUL, an exchange break layer (EBL) to break the magnetic exchange coupling between the magnetically permeable films of the SUL and the RL and to facilitate epitaxial growth of the RL, and a protective overcoat (OC). As shown in FIG. 2, the RL is located inside the gap of the "apparent" recording head (ARH), which allows for significantly higher write fields compared to longitudinal or in-plane recording. The ARH comprises the write pole (FIG. 1) which is the real write head (RWH) above the disk, and a secondary write pole (SWP) beneath the RL. The SWP is facilitated by the SUL, which is decoupled from the RL by the EBL and produces a magnetic image of the RWH during the write process. This effectively brings the RL into the gap of the ARH and allows for a large write field H inside the RL.

Magnetic recording media that have RLs formed of granular ferromagnetic cobalt alloys, such as the cobalt alloys used for perpendicular recording, exhibit increasing intrinsic media noise with increasing linear recording density. Media noise arises from irregularities in the recorded magnetic transitions and results in random shifts of the readback signal peaks. High media noise leads to high bit error rates. Thus to obtain higher areal densities in magnetic recording disk drives, it is necessary to decrease the intrinsic media noise, i.e., increase the signal-to-noise ratio (SNR), of the recording media. The media SNR is to first order proportional to 20 log ($N^{1/2}$), where N is the number of magnetic grains per unit area in the media. Accordingly, increases in SNR can be accomplished by increasing N.

Improved media SNR can be achieved with "laminated" media. In laminated media, the single magnetic layer is replaced with a laminate of two or more separate magnetic layers that are spaced apart and magnetically decoupled by nonmagnetic spacer layers. This discovery was made for horizontal or longitudinal magnetic recording media by S. E. Lambert, et al., "Reduction of Media Noise in Thin Film Metal Media by Lamination", *IEEE Transactions on Magnetics*, Vol. 26, No. 5, September 1990, pp. 2706-2709, and patented in U.S. Pat. No. 5,051,288. A laminated media structure with two perpendicular RLs separated by a nonmagnetic spacer layer (SL) is shown schematically in FIG. 3. The presence of two decoupled RLs doubles N, the number of grains per area, leading to the SNR improvement. Laminated media do exhibit improved bit error rate (BER), as expected based on the SNR increase, but they require a higher field from the write head than for media with single-layer RLs to achieve the improved BER.

The need for higher write fields is not limited to laminated media. Higher write fields are required for perpendicular media with single-layer RLs than for comparable horizontal media with single-layer RLs. This can be appreciated by reference to FIG. 2 which shows the write field H inside the RL being oriented nearly parallel to the surface normal, i.e., along the perpendicular easy axis of the RL grains, as shown by typical grain 1 with easy axis 2. The parallel alignment of the write field H and the RL easy axis has the disadvantage that relatively high write fields are necessary to reverse the magnetization because minimal torque is exerted onto the grain magnetization. For these reasons, a composite medium consisting of two ferromagnetically exchange-coupled magnetic layers has been proposed. Magnetic simulation of this composite medium shows that in the presence of a write field the magnetization of the upper magnetic layer will rotate first and assist in the reversal of the magnetization of the lower magnetic layer. This behavior, sometimes called the "exchange-spring" behavior, and various types of composite media are described by R. H. Victora et al., "Composite Media for Perpendicular Magnetic Recording", *IEEE Transactions on Magnetics*, 41 (2), 537-542, Feb. 2005; and J. P. Wang et al., "Composite media (dynamic tilted media) for magnetic recording", *Appl. Phys. Lett.* 86 (14) Art. No. 142504, Apr. 4 2005. Pending application Ser. No. 11/231, 516 filed Sep. 21, 2005, and assigned to the same assignee as this application, describes a perpendicular magnetic recording medium with an exchange-spring structure.

What is needed is a perpendicular magnetic recording medium that has high recording density and high SNR and yet is easy to write.

SUMMARY OF THE INVENTION

The invention is a laminated perpendicular magnetic recording medium having two recording layers (RL1 and RL2) that are separated and magnetically decoupled by a nonmagnetic spacer layer (SL). The SL has a thickness and composition to assure there is no antiferromagnetic or ferromagnetic coupling between RL1 and RL2. Thus in the presence of the write field, RL1 and RL2 respond independently and become oriented with the direction of the write field. Each RL is an "exchange-spring" type magnetic recording layer formed of two ferromagnetic layers (MAG1 and MAG2) that have substantially perpendicular magnetic anisotropy and are ferromagnetically exchange-coupled by a nonmagnetic or weakly ferromagnetic coupling layer (CL). In each RL, the magnetic layer closer to the write head, i.e., MAG2, may have a lower anisotropy field than MAG1. MAG1 and MAG2 in each RL may also have substantially similar anisotropy fields because each RL takes advantage of the depth-dependent write field, i.e., in general a write head produces a larger magnetic field and larger field gradient near the surface of the RL, while the field strength decreases further inside the RL. The medium takes advantage of lamination to attain higher SNR (and lower BER) yet has improved writability as a result of each RL being an exchange-spring type RL.

For a fuller understanding of the nature and advantages of the present invention, reference should be made to the following detailed description taken together with the accompanying figures.

DETAILED DESCRIPTION OF THE INVENTION

Perpendicular magnetic recording layers, such as hcp granular ferromagnetic cobalt alloys, exhibit perpendicular uniaxial magnetic anisotropy. Uniaxial magnetic anisotropy of a ferromagnetic layer with an anisotropy constant K means essentially that all of the magnetic moments tend to align along the same axis, referred to as the easy axis, which is the lowest energy state. The anisotropy field $H_k$ of a ferromagnetic layer with uniaxial magnetic anisotropy K is the magnetic field that would need to be applied along the easy axis to switch the magnetization direction.

Figure 1:
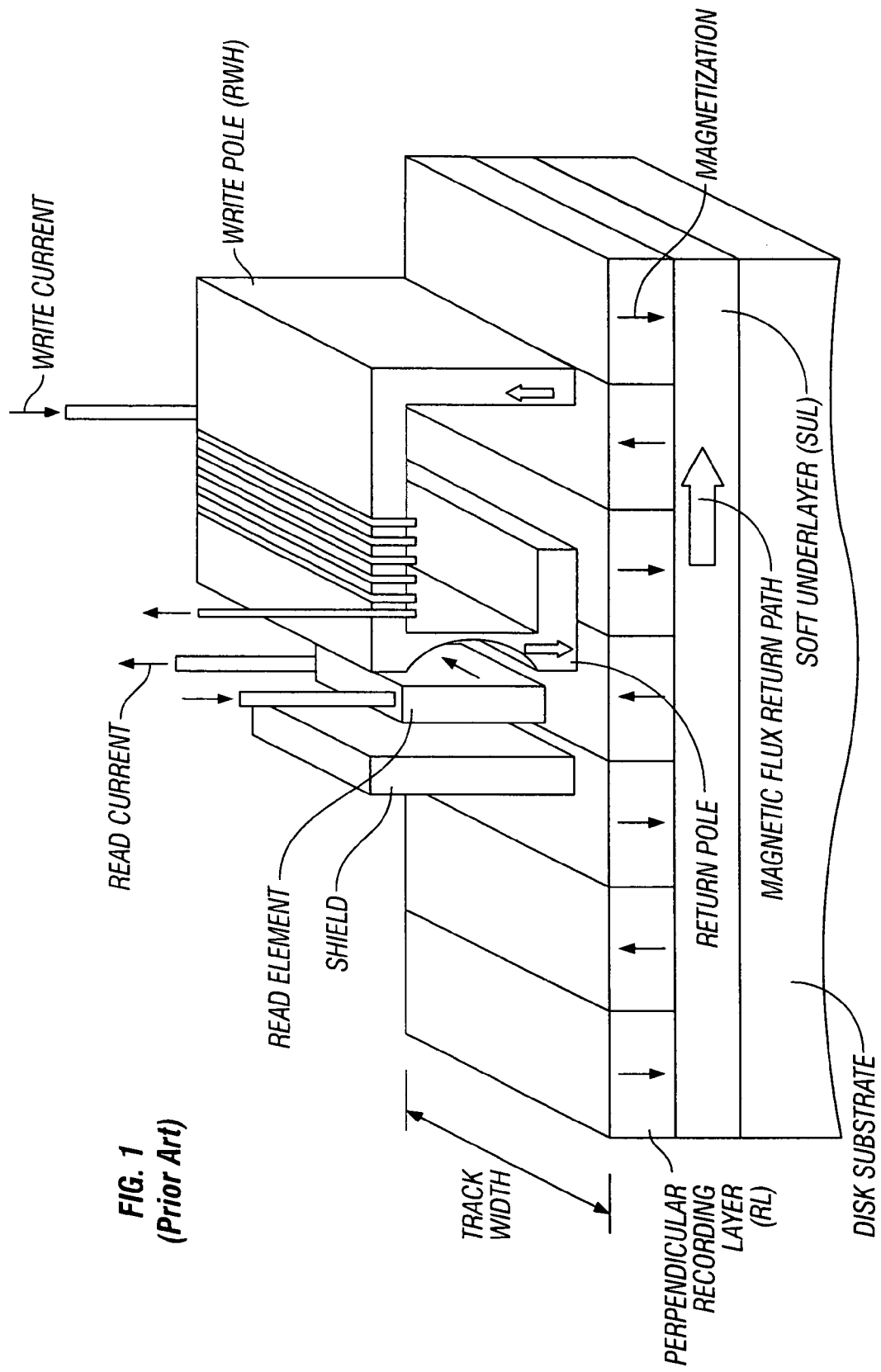
FIG. 1 is a schematic of a prior art perpendicular magnetic recording system.
Figure 2:
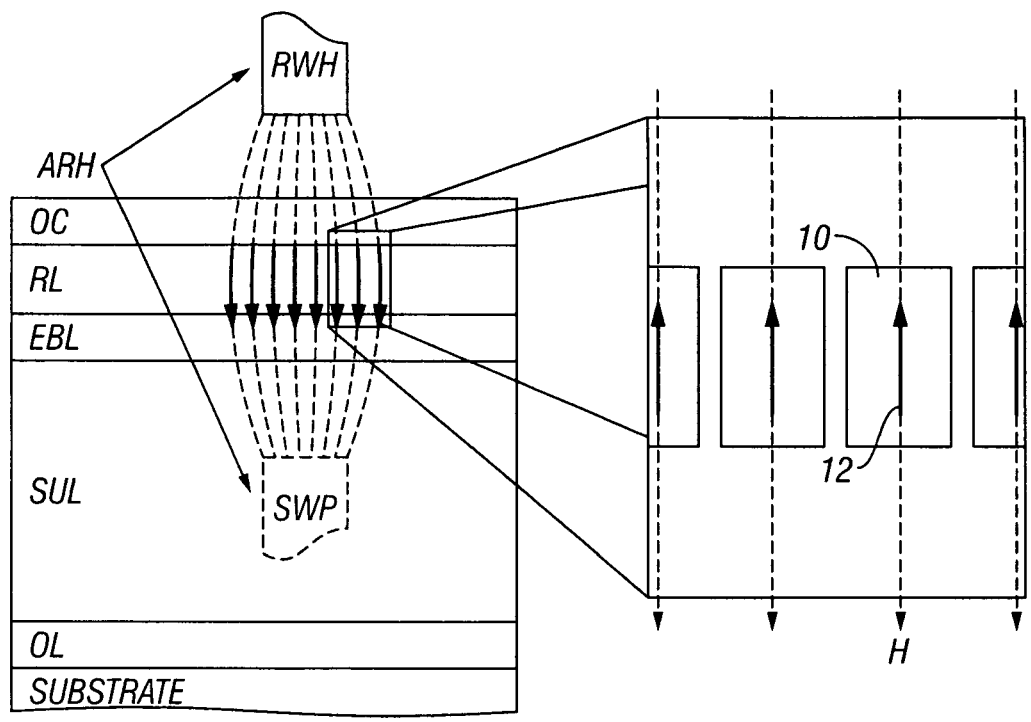
FIG. 2 is a schematic of a cross-section of a prior art perpendicular magnetic recording disk showing the write field H acting on the recording layer (RL).
Figure 3:
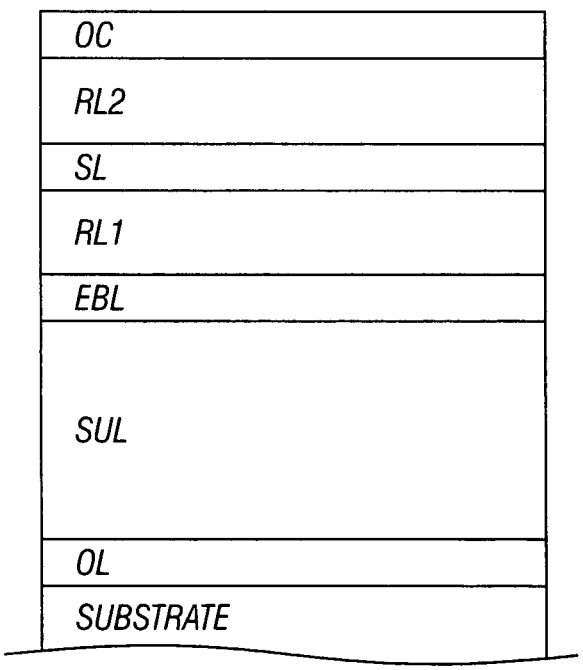
FIG. 3 is a schematic of a cross-section of a perpendicular magnetic recording disk with laminated recording layers RL1 and RL2.
Figure 4:
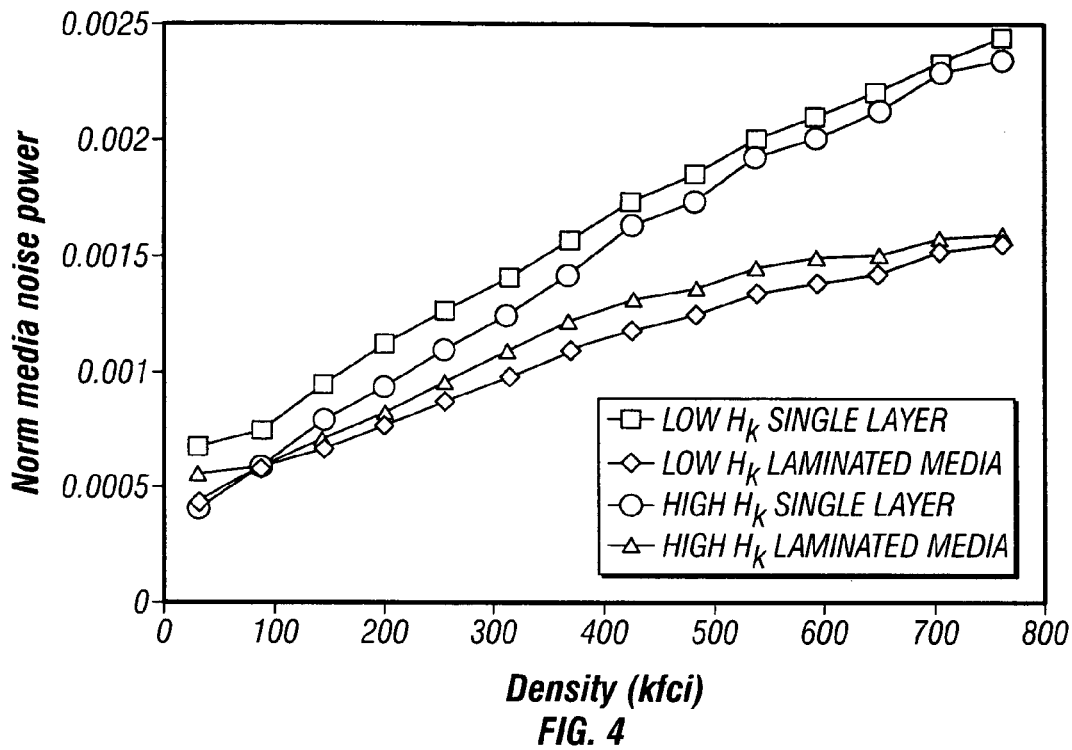
FIG. 4 is a graph of normalized media noise power as a function of linear recording density (in units of thousand flux changes per inch or kfci) for low-anisotropy-field single-layer and laminated perpendicular media and high-anisotropy-field single-layer and laminated perpendicular media.
Figure 5:
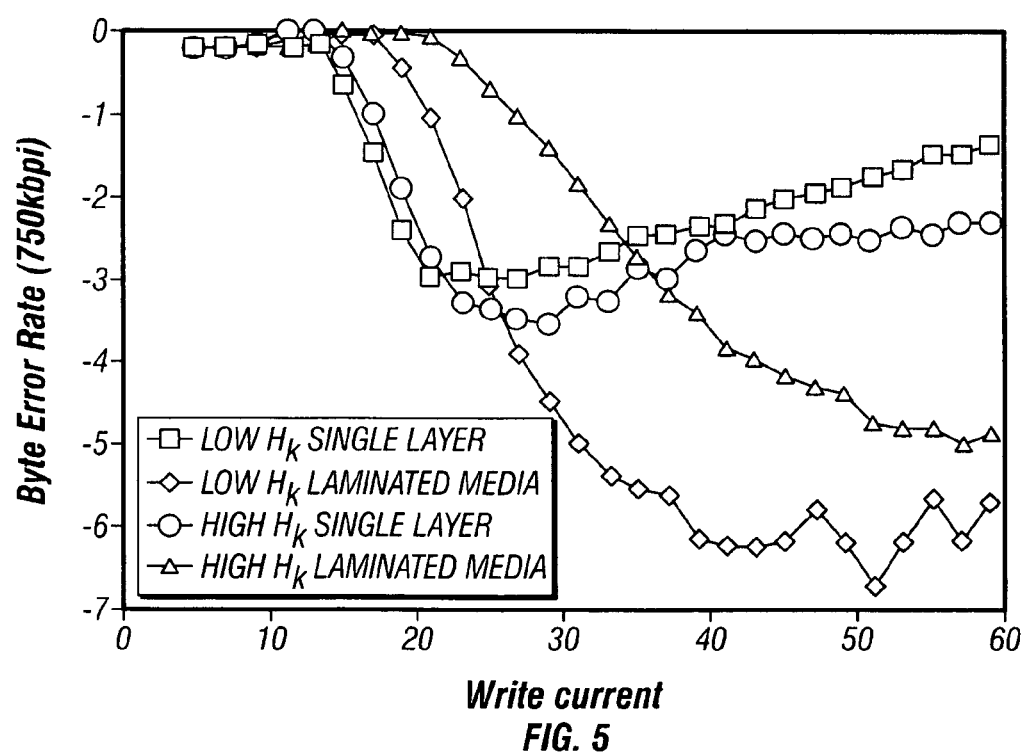
FIG. 5 is a graph of byte error rate as a function of write current for low-anisotropy-field single-layer and laminated perpendicular media and high-anisotropy-field single-layer and laminated perpendicular media.

FIG. 4 illustrates the improvement in SNR for laminated perpendicular media (FIG. 3) over single-layer perpendicular media (FIG. 2). The normalized noise power is related to the inverse of the SNR, so in FIG. 4 lower values at higher recording density represent higher SNR. The improvement is shown for both low-anisotropy-field media ($H_k$ about 10 kOe) and high-anisotropy-field media ($H_k$ about 12 kOe). Laminated media exhibit a higher SNR and thus a lower BER, but they require a higher field from the write head to achieve the improved BER. This is shown by FIG. 5, which is a graph comparing byte error rate as a function of write current for the laminated perpendicular media with the single-layer perpendicular media. The lower byte error rate at higher write currents is shown for both low-anisotropy-field media and high-anisotropy-field media.

The invention is a perpendicular magnetic recording medium that takes advantage of lamination to attain higher SNR (and lower BER) yet requires lower write current than would typically be required to reverse the magnetization in the laminated media. The structure of a perpendicular magnetic recording medium according to the invention is shown in sectional view in FIG. 6. The disk has two exchange-spring type RLs (RL1 and RL2) magnetically decoupled from each other and separated by a non-ferromagnetic spacer layer (SL). Each RL comprises at least two ferromagnetically exchange-coupled magnetic layers (MAG1 and MAG2), each with perpendicular magnetic anisotropy. The magnetizations of MAG1 and MAG2 in each RL are oriented parallel, either up or down in FIG. 6, to represent the two remnant magnetic states. MAG1 and MAG2 (and additional magnetic layers if more than two magnetic layers are used) are separated by a ferromagnetic coupling layer (CL) that provides the appropriate ferromagnetic coupling strength between the magnetic layers in each RL. Also, the magnetizations of MAG1 and MAG2 in RL1 and MAG1 and MAG2 in RL2 are parallel because SL has a composition and/or thickness to assure that RL1 and RL2 are magnetically decoupled. Thus in the presence of the write field H, RL1 and RL2 respond independently and become oriented with the direction of the write field.

MAG1 and MAG2 may have substantially similar anisotropy fields $H_k$, or the magnetic layer closer to the write head, i.e., MAG2, may have a lower $H_k$ than MAG1. If MAG1 and MAG2 have substantially similar anisotropy fields $H_k$, then the $H_k$ for MAG2 should be at least 70% and preferably at least 90% of the $H_k$ for MAG1. This can be achieved by forming MAG1 and MAG2 of substantially the same materials and composition, which simplifies the fabrication process. MAG1 and MAG2 may have substantially similar anisotropy fields because each RL structure takes advantage of the depth-dependent write field H, i.e., in general a write head produces a larger magnetic field and larger field gradient near the surface of the RL, while the field strength decreases further inside the RL. The high field and field gradient near the top of the RL, where MAG2 is located, enables MAG2 to be formed of a high-$H_k$ material. As the magnetization of MAG2 is reversed by the write field it assists in the magnetization reversal of the lower magnetic layer MAG1. In this non-coherent reversal of the magnetizations of MAG1 and MAG2, MAG2 changes its magnetization orientation in response to a write field and in turn amplifies the "torque," or reverse field, exerted on MAG1, causing MAG1 to change its magnetization direction in response to a weaker write field than would otherwise be required in the absence of MAG2. Because of its function in this manner, the upper magnetic layer in each RL (MAG2) is sometimes referred to as an "exchange-spring" layer. Although the write field acting on MAG1 can be significantly less than the write field acting on MAG2, MAG1 can have substantially the same $H_k$ because of the torque created by the magnetization reversal of MAG2.

MAG1 and MAG2 can thus have substantially the same material composition and thus substantially similar anisotropy fields $H_k$.

Figure 6:
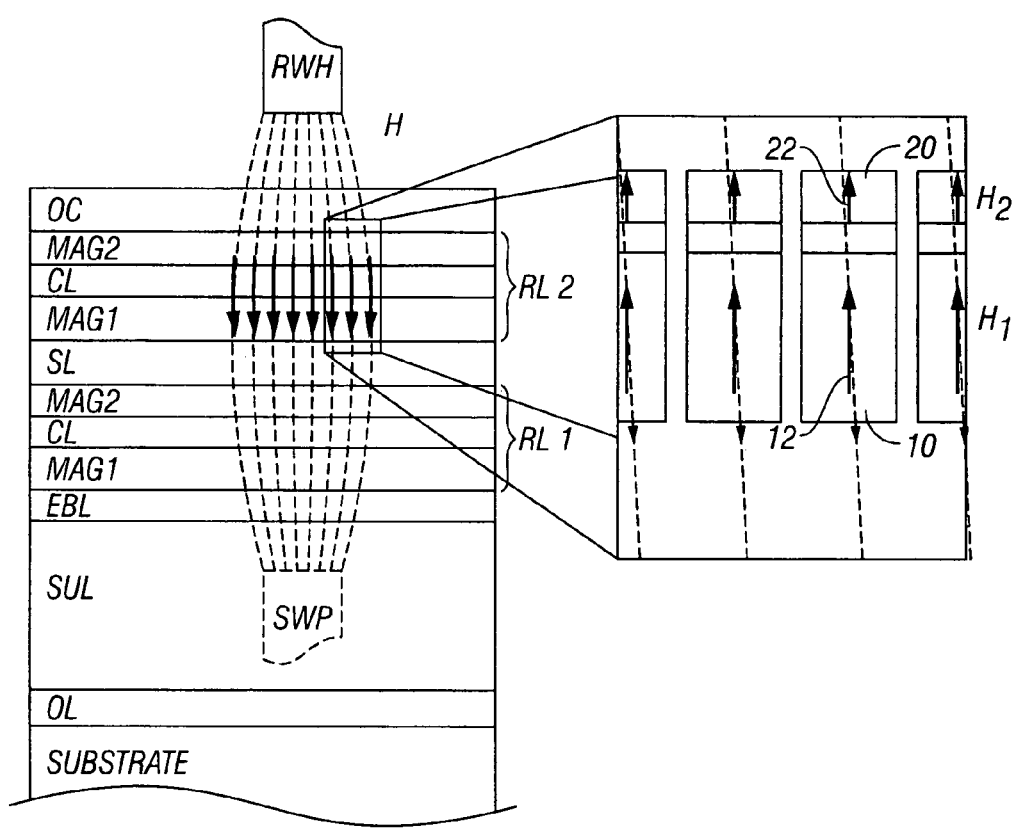
FIG. 6 is a schematic of a cross-section of the perpendicular magnetic recording disk according to the invention showing laminated recording layers (RL1 and RL2), each being formed of two magnetic layers separated by a ferromagnetic coupling layer (CL), and an enlarged view showing the write field acting on RL2.

As shown in the exploded portion of FIG. 6, a typical grain 20 in MAG2 has a perpendicular or out-of-plane magnetization along an easy axis 22 and is acted upon by a write field H2. A typical grain 10 in MAG1 below the MAG2 grain 20 also has a perpendicular magnetization along an easy axis 12, and is acted upon by a write field H1 less than H2. For magnetic layer thicknesses and write heads in future perpendicular magnetic recording systems, the field H2 applied at the upper magnetic layer may be substantially greater, e.g., 40% greater, than the field H1 applied at the lower magnetic layer. In the presence of the applied perpendicular write field H2, the MAG2 acts as a write assist layer by exerting a magnetic torque onto MAG1 that assists in reversing the magnetization of MAG1. The grains 20 are coupled to grains 10 by the coupling layer (CL).

The CL should mediate a coupling field $H_J$ sufficient to provide a considerable reduction on the switching field $H_s$, but small enough to not couple the MAG1 and MAG2 layers rigidly together. Micromagnetic simulations for the RL with "weakly" coupled MAG1 and MAG2, i.e., a coupling field $H_J$ of approximately $0.25H_k$, showed non-coherent magnetization reversal and thereby a reduction in the required $H_S$. The simulated RL also showed a low dependence of $H_S$ on field angle, i.e., the angle between the write field and the orientation of the MAG1 and MAG2 grains. This is important because it is not possible to manufacture a RL in which the grain orientations in MAG1 and MAG2 are a constant value at all locations in the RL, so the grains will exhibit a grain orientation distribution that contributes to the switching field distribution. The reduced angular dependence of Hs results in a reduced switching field distribution. Because it is known that a large switching field distribution is a significant contributor to media jitter, which is a source of intrinsic media noise, the RL structure will improve media SNR. Thus, in addition to the improved media SNR as a result of lamination of RL1 and RL2, each RL structure will also contribute to improved SNR.

A representative disk structure for the invention shown in FIG. 6 will now be described. The hard disk substrate may be any commercially available glass substrate, but may also be a conventional aluminum alloy with a NiP surface coating, or an alternative substrate, such as silicon, canasite or silicon-carbide.

The adhesion layer or OL for the growth of the SUL may be an AlTi alloy or a similar material with a thickness of about 2-5 nm. The SUL may be formed of magnetically permeable materials such as alloys of CoNiFe, FeCoB, CoCuFe, NiFe, FeAlSi, FeTaN, FeN, FeTaC, CoTaZr, CoFeB, and CoZrNb. The SUL may also be a laminated or multilayered SUL formed of multiple soft magnetic films separated by nonmagnetic films, such as electrically conductive films of Al or CoCr. The SUL may also be a laminated or multilayered SUL formed of multiple soft magnetic films separated by interlayer films that mediate an antiferromagnetic coupling, such as Ru, Ir, or Cr or alloys thereof.

The EBL is located on top of the SUL. It acts to break the magnetic exchange coupling between the magnetically permeable films of the SUL and the RL and also serves to facilitate epitaxial growth of the RL. The EBL may not be necessary, but if used it can be a nonmagnetic titanium (Ti) layer; a non-electrically-conducting material such as Si, Ge and SiGe alloys; a metal such as Cr, Ru, W, Zr, Nb, Mo, V and Al; a metal alloy such as amorphous CrTi and NiP; an amorphous carbon such as $CN_x$, $CH_x$ and C; or oxides, nitrides or carbides of an element selected from the group consisting of Si, Al, Zr, Ti, and B. If an EBL is used, a seed layer may be used on top of the SUL before deposition of the EBL. For example, if Ru is used as the EBL, a 2-4 nm thick NiFe seed layer may be deposited on top of the SUL, followed by a 5-20 nm thick Ru EBL.

MAG1 and MAG2 in RL1 and RL2 may be formed of any of the known amorphous or crystalline materials and structures that exhibit perpendicular magnetic anisotropy. Thus, MAG1 and MAG2 may each be a layer of granular polycrystalline cobalt alloy, such as a CoPt or CoPtCr alloy, with or without an oxide, such as oxides of Si, Ta, Ti, Nb and B. For example, MAG1 and MAG2 may be formed of $Co_{57}Pt_{18}Cr_{17}(SiO_2)_8$, with MAG1 having a thickness of 13 nm and MAG2 having a thickness of 3 nm. MAG1 and MAG2 may have substantially the same anisotropy field $H_k$, which can be achieved by forming them of substantially the same materials and composition, which simplifies the fabrication process. In the preferred embodiment the lower layer (MAG1) is thicker than the upper layer (MAG2). MAG1 and MAG2 may also have substantially different anisotropy fields, with upper layer MAG2, the exchange-spring layer, preferably having the lower anisotropy field to assure it has its magnetization reversed first to assist in reversing the magnetization of the lower MAG1 layer.

Because each CL is below its corresponding MAG2, it should be able to sustain the growth of MAG2, while mediating a weak ferromagnetic coupling between the MAG2 and MAG1. Hexagonal-close-packed (hcp) materials for instance, which can mediate a weak ferromagnetic coupling and provide a good template for the growth of MAG2, are good candidates. Because the CL must enable an appropriate coupling strength, it should be either nonmagnetic or weakly ferromagnetic. Thus the CL may be formed of RuCo and RuCoCr alloys with low Co content (<about 40 atomic percent), or CoCr and CoCrB alloys with high Cr and/or B content (Cr+B>about 30 atomic percent). Si-oxide or other oxides like oxides of Ta, Ti, Nb and B may be added to these alloys in an amount up to about 15 atomic percent.

Depending on the choice of material for CL, and more particularly on the concentration of cobalt (Co) in the CL, the CL may have a thickness of less than 2.0 nm, and more preferably between about 0.2 nm and 1.0 nm, although in certain embodiments, the thickness of the CL may exceed 1.0 nm. Because Co is highly magnetic, a higher concentration of Co in the CL may be offset by thickening the CL to achieve an optimal inter-layer exchange coupling between MAG1 and MAG2. The inter-layer exchange coupling between MAG1 and MAG2 may be optimized, in part, by adjusting the materials and thickness of the CL. The CL should provide a coupling strength sufficient to have a considerable effect on the switching field (and the switching field distribution), but small enough to not couple the MAG1 and MAG2 layers rigidly together. For example, if MAG1 and MAG2 are each formed of $Co_{57}Pt_{18}Cr_{17}(SiO_2)_8$, with MAG1 having a thickness of 13 nm and MAG2 having a thickness of 3 nm, then the CL may be $Ru_{50}Co_{30}Cr_{20}$, which contains enough Co to mediate sufficient ferromagnetic exchange coupling in a 0.4 to 0.7 nm CL thickness range.

While the structure and function of each exchange-spring type RL is substantially as described above, RL1 and RL2 do not need to be identical. For example, it may be desirable to have RL1, the lower RL, have MAG1 and MAG2 with lower $H_k$ values than MAG1 and MAG2 in RL2, the upper RL, because of the lower write field to which RL1 is exposed.

The lamination of RL1 and RL2 is provided by the spacer layer SL that magnetically decouples RL1 and RL2. SL is formed of a non-ferromagnetic material, such as Cr, Ru, CoRu (where Ru>40 atomic percent and has a thickness and composition adjusted such that RL1 and RL2 are not ferromagnetically exchange coupled, or the ferromagnetic exchange field is less than about 200 Oe), CoCr (where Cr>40 atomic percent and has a thickness and composition adjusted such that RL1 and RL2 are not ferromagnetically exchange coupled or the ferromagnetic exchange field is less than about 200 Oe), CoCrXO_(where X can be Si, Ta, or Nb, and the alloy has Cr>26 atomic percent to ensure it is nonmagnetic). The SL has a thickness and composition to assure there is no antiferromagnetic or ferromagnetic coupling between RL1 and RL2. For example, if MAG1 and MAG2 in each of RL1 and RL2 are formed of CoPtCr(SiO$_2$) with H$_k$ in the range of about 10 to 15 kOe, then the SL may be a 1 to 10 nm thick layer of Ru.

The OC formed on top of the RL may be an amorphous "diamond-like" carbon film or other known protective overcoats, such as Si-nitride.

While the invention has been shown and described with each RL having only two magnetic layers and one CL, each RL may have three or more magnetic layers, with additional CLs as required to mediate weak exchange coupling between adjacent magnetic layers.

The medium according to this invention thus provides improved SNR as a result of the lamination of RL1 with RL2, as well as improved writability as a result of each RL being an exchange-spring type RL.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A perpendicular magnetic recording medium having regions magnetized in one of two remanent magnetic states and comprising:
   a substrate;
   a first recording layer on the substrate comprising a first ferromagnetic layer having an out-of-plane easy axis of magnetization, a second ferromagnetic layer having an out-of-plane easy axis of magnetization, and a Co-containing coupling layer on the first ferromagnetic layer and between the first ferromagnetic layer and the second ferromagnetic layer for ferromagnetic coupling of the first ferromagnetic layer with the second ferromagnetic layer, the ferromagnetically-coupled first and second ferromagnetic layers of the first recording layer having parallel magnetizations in the remanent magnetic states and the first ferromagnetic layer of the first recording layer having an anisotropy field greater than the anisotropy field of the second ferromagnetic layer of the first recording layer;
   a second recording layer comprising a first ferromagnetic layer having an out-of-plane easy axis of magnetization, a second ferromagnetic layer having an out-of-plane easy axis of magnetization, and a Co-containing coupling layer on the first ferromagnetic layer and between the first ferromagnetic layer and the second ferromagnetic layer for ferromagnetic coupling of the first ferromagnetic layer with the second ferromagnetic layer, the ferromagnetically-coupled first and second ferromagnetic layers of the second recording layer having parallel magnetizations in the remanent magnetic states and the first ferromagnetic layer of the second recording layer having an anisotropy field greater than the anisotropy field of the second ferromagnetic layer of the second recording layer and greater than the anisotropy field of the first ferromagnetic layer of the first recording layer; and
   a non-ferromagnetic spacer layer on the first recording layer and between the first recording layer and the second recording layer for magnetically decoupling the first and second recording layers, the first and second recording layers having parallel magnetizations in the remanent magnetic states.

2. The medium of claim 1 wherein each of the first and second ferromagnetic layers in each of the first and second recording layers is a hexagonal-close-packed material with its c-axis oriented substantially perpendicular to its layer and the coupling layer in each of said first and second recording layers is a hexagonal-close-packed material with its c-axis oriented substantially perpendicular to its layer.

3. The medium of claim 1 wherein each of said Co-containing coupling layers is formed of a material selected from the group consisting of (a) a RuCo alloy with Co less than about 40 atomic percent, (b) a RuCoCr alloy with Co less than about 40 atomic percent, and (c) an alloy of Co and one or more of Cr and B with the combined content of Cr and B greater than about 30 atomic percent.

4. The medium of claim of claim 3 wherein each of said Co-containing coupling layers further comprises one or more oxides of one or more elements selected from the group consisting of Si, Ta, Ti, Nb and B.

5. The medium of claim 1 farther comprising an underlayer of magnetically permeable material on the substrate and an exchange break layer between the underlayer and the first recording layer for preventing magnetic exchange coupling between the underlayer and the first recording layer.

6. The medium of claim of claim 1 wherein each of the first and second ferromagnetic layers in the first recording layer and each of the first and second ferromagnetic layers in the second recording layer is a granular polycrystalline cobalt alloy.

7. The medium of claim 6 wherein each of the first and second ferromagnetic layers in the first recording layer and each of the first and second ferromagnetic layers in the second recording layer farther comprises an oxide of one or more of Si, Ta, Ti, Nb and B.

8. A perpendicular magnetic recording disk having regions magnetized in one of two remanent magnetic states and comprising:
   a substrate;
   an underlayer of magnetically permeable material on the substrate;
   a first exchange-spring recording structure (RL1) on the underlayer comprising a pair of granular polycrystalline cobalt alloy ferromagnetic layers separated by a coupling layer permitting ferromagnetic coupling of the first ferromagnetic layer (MAG1) with the second ferromagnetic layer (MAG2) in said first structure, each of said ferromagnetic layers in said first structure having substantially perpendicular magnetic anisotropy, wherein MAG1 in RL1 is closer to the substrate than MAG2 in RL1 and has an anisotropy field greater than the anisotropy field of MAG2 in RL1and wherein MAG1 and MAG2 in RL1 have parallel magnetizations in the remanent magnetic states as a result of ferromagnetic coupling by the coupling layer;
   a second exchange-spring recording structure (RL2) comprising a pair of granular polycrystalline cobalt alloy ferromagnetic layers separated by a coupling layer permitting ferromagnetic coupling of the first ferromagnetic layer (MAG1) with the second ferromagnetic layer (MAG2) in said second structure, each of said ferromagnetic layers in said second structure having substantially perpendicular magnetic anisotropy, wherein MAG1 in RL2 is closer to the substrate than MAG2 in RL2 and has an anisotropy field greater than the anisotropy field of MAG2 in RL2 and greater than the anisotropy field of MAG1 in RL1 and wherein MAG1 and MAG2 in RL2 have parallel magnetizations in the remanent magnetic states as a result of ferromagnetic coupling by the coupling layer; and a non-ferromagnetic spacer layer on RL1 and between RL1 and RL2 for magnetically decoupling RL1 and RL2; wherein RL1 and RL2 have parallel magnetizations in the remanent magnetic states; and wherein each coupling layer is formed of a material selected from the group consisting of (a) a RuCo alloy with Co less than about 40 atomic percent, (U a RuCoCr alloy with Co less than about 40 atomic percent, and (c) an alloy of Co and one or more of Cr and B with the combined content of Cr and B greater than about 30 atomic percent.

9. The disk of claim 8 wherein each of the ferromagnetic layers in each of the exchange-spring recording structures farther comprises an oxide of one or more of Si, Ta, Ti, Nb and B.

10. The disk of claim 8 further comprising an exchange break layer between the underlayer and the first exchange-spring recording structure for preventing magnetic exchange coupling between the underlayer and the first exchange-spring recording structure.

11. A perpendicular magnetic recording system comprising: the disk of claim 8;
a write head for magnetizing regions in the ferromagnetically-coupled first and second exchange-spring recording structures of said disk; and
a read head for detecting the transitions between said magnetized regions.

* * * * *